United States Patent [19]

Pardee et al.

[11] 3,862,860

[45] Jan. 28, 1975

[54] METHOD AND COMPOSITION FOR LUBRICATING AND LUBRICATED SUBSTRATES

[75] Inventors: Robert P. Pardee; Archie L. Bickling, Jr.; Thomas J. Loran, all of Boulder, Colo.

[73] Assignee: Ball Brothers Research Corporation, Boulder, Colo.

[22] Filed: June 25, 1973

[21] Appl. No.: 373,577

[52] U.S. Cl............ 117/239, 117/34, 117/138.8, 117/161, 96/87, 252/58
[51] Int. Cl........ C03c 1/00, C03c 1/74, C03c 3/26, C10m 1/00, C10m 3/24, C10m 5/19, C10m 7/28, B44d 1/09, C09d 3/48
[58] Field of Search ......... 117/34, 138.8, 239, 161; 252/58; 96/87

[56] References Cited
UNITED STATES PATENTS

| | | | |
|---|---|---|---|
| 3,079,837 | 3/1960 | Theilemann | 117/34 |
| 3,103,490 | 9/1963 | Green | 252/58 |
| 3,445,393 | 5/1969 | Hinds | 252/58 |
| 3,490,946 | 1/1970 | Wolff | 117/238 |
| 3,579,370 | 5/1971 | Punderson et al. | 117/138.8 |

Primary Examiner—Norman G. Torchin
Assistant Examiner—J. P. Brammer
Attorney, Agent, or Firm—Gilbert E. Alberding

[57] ABSTRACT

Method and composition for improving lubricity, abrasion resistance, and lowering the coefficient friction of substrates such as photographic film, magnetic surfaces and other recording elements by applying to such substrates a solution comprising tetrafluoroethylene telomer and a copolymer of vinyl chloride and trifluorochloroethylene in a volatile solvent, drying and removing the excess, and substrates so lubricated.

17 Claims, No Drawings

METHOD AND COMPOSITION FOR LUBRICATING AND LUBRICATED SUBSTRATES

BACKGROUND OF THE INVENTION

1. Field of the Invention

The present invention pertains generally to lubrication of substrates and, more particularly, to an improved two-component lubrication composition and method of application, and, further, to an improved, scratch-resistant, low friction lubricated substrates such as photographic film and recording elements.

2. Description of the Prior Art

Lubrication of various substrates, and particularly of substrates upon which information has been stored and from which the information can be recalled by dynamic means, has long been recognized as a most difficult problem. Examples of such substrates include computer recording disks, magnetic recording for sound and video production and photographic projection film such as moving picture film, slide film and microfilm. Previous attempts to provide such lubrication have met with varying success.

Lubrication of photographic film, and particularly lubrication of photographic film utilized either statically or dynamically, for projection of images by directing a light beam through transparent photographic film, presents one of the most difficult of lubrication problems. When photographic film is repeatedly positioned in a gate or holder, the mechanical interface tends to abrade the film and, in the instance of motion pictures, such abrasion or sticking causes an erratic presentation upon the screen as the photographic film binds and releases. Recently, an even more demanding application has appeared. This involves continuous roll film cartridges utilizing a continuous loop of photographic film which unwinds internally of the roll and rewinds on the periphery of the roll. Rather substantial friction occurs as the photographic film is pulled laterally, in a generally spiral configuration, from the center portion of the roll. Despite such greatly increased wear potential, continuous loop film cartridges are finding favor as convenience items for use in such as projection of feature films on aircraft, sales films, educational films, etc.

Photographic film, by its nature, is a difficult substrate with regard to lubrication and wear. Basically, photographic film comprises a relatively soft emulsion coated on a generally pliant support. The emulsion must be both protected from abrasion and provided with a low coefficient of friction. Merely providing a low coefficient of friction does not afford the necessary protection in that the soft emulsion does not have the strength to withstand substantial forces impinging thereon even if friction is low. However, a prime consideration of the prior art has been to lower the coefficient of friction often to the exclusion of providing a protective coating with regard to surface coating strength. Since the emulsion has little inherent strength and scratch resistance, the lubricous coating must provide these properties as well as low friction. In addition to the emulsion side, it is important to also protect and lubricate the "backside" of the film since scratches therein will also be visible in projections.

Another seemingly apparent attribute of a lubricous coating for photographic film, and particularly photographic film which is intended for projection, is transparency of the coating. However, many of the previous coatings avoid complete opacity only by utilizing quite thin coatings. Though essentially opaque, little lubricant is applied as to permit adequate, if not complete, light transmission. The problem of opacity is compounded when properties other than lubricity, i.e., strength, are provided through the use of more than one component.

While photographic film is particularly difficult to lubricate, magnetic recording elements present somewhat different but also demanding conditions. Coatings of lubricants must be quite thin to avoid degrading the interaction between the recording or pickup head and magnetic particles. The lubricous coating must not accumulate on the head. In the case of disk and cylindrical rotors recording elements, "flying heads" used with such recording elements tend to "crash" on the element with tremendous localized forces being generated. Thus, protection must be afforded the disk to prevent damage thereto as a result of such crashes.

Magnetic tape is comprised of highly abrasive particles dispersed in a binder. Without protection, the recording head can be rapidly worn by the particles as the magnetic tape moves over the recording head.

Put succinctly, the operating environment and nature of magnetic recording elements require most demanding performance from lubricants used thereon.

Various waxes and other substances have been used to lubricate substrates. Also, fluorinated compositions, such as Vydax composition, have been used as lubricants in sundry applications. U.S. Pat. No. 3,490,946 discusses the use of such fluorinated polymers in conjunction with lubrication of magnetic tapes. Generally, this patent would appear to constitute a typical prior art approach to lubrication of magnetic recording elements.

The most pertinent prior art applicable to photographic films would again appear to be the use of Vydax, a proprietary tetrafluoroethylene telomer, as a photographic film lubricant. This specific lubricant was utilized as a performance reference with regard to testing the effectiveness of the method and composition of the instant invention.

SUMMARY OF THE INVENTION

The present invention, which provides a scratch-resistant lubricous coating for substrates, comprises a two-component composition, one of which primarily provides lubricity and the other of which primarily imparts strength to the coating. The two components, in combination, display the synergistic property of providing a coefficient of friction lower than that provided by either component separately. Optionally, the composition can be easily refined to provide a transparent coating for photographic film while maintaining the desirable lubrication properties.

Accordingly, an object of the present invention is to provide a composition and method which produces a substrate having low friction characteristics.

Another object of the present invention is to provide a composition and method which imparts abrasion resistance to substrates through a protective coating capable of bearing a high load.

Yet another object of the present invention is to provide a composition and method which produces a coating on photographic film which is transparent to light.

Still another object of the present invention is to provide a method by which the composition of the instant invention may be conveniently applied with simple equipment.

Still yet another object of the present invention is to provide coated substrates having long life, great wear resistance and low surface friction.

Yet still another object of the present invention is to provide a photographic film having both high lubricity and excellent light transmission.

A further object of the present invention is to provide an improved, thin lubrication system for substrates having data or information stored thereon and which are subjected to dynamic presentation to utilize such stored information.

These and other objects of the present invention will become apparent from the following description and discussion.

DETAILED DESCRIPTION OF THE INVENTION

According to the present invention, a mixture comprising a relatively short chain length copolymer of trifluorochloroethylene and vinyl chloride to provide a hard, wear resistant surface and a relatively short chain length telomer of tetrafluoroethylene to afford lubricity, is employed to produce a superior, low friction, scratch-resistant and, if desired, light transparent coating on a substrate. It is most surprising that such a composition would produce superior results while improving operation in several apparently incompatible respects. For instance, at least part of the composition is refined to remove longer chain-length constituents. This, as expected, produces a clearer coating and, with filtration of the entire composition, much better light transmission. However, unexpectedly, the wear and scratch resistance is not only maintained, but is improved relative to the use of longer chain similar lubricating substance, i.e., the prior art use of Vydax lubricant. Normally, it would be expected that the wear resistance would not be improved to provide, through the use of shorter chain lubricants and other constituents, increased light transmission.

Also, copolymers of trifluorochloroethylene and vinyl chloride do not function as lubricants. Such copolymers, when utilized alone on, for instance, photographic film, produce coefficients of friction in the range of 0.40 to 0.43. The telomer of tetrafluoroethylene does serve as a lubricant and produces, when applied alone on, for instance, photographic film, coefficients of friction of about 0.19 to 0.20. However, when the two substances are used together on photographic film, i.e., a combination of a lubricant and a nonlubricant, coefficients of friction of 0.11 to 0.13 result. This reduction of at least 30 percent in the coefficient of friction relative to the coefficient of the best individual lubricant in the composition is in addition to the primary function of the trifluorochloroethylene and vinyl chloride copolymer, i.e., provide a tough, abrasion-resistant surface. It was not apparent that this latter function could even be accomplished with an acceptable coefficient of friction, and certainly not that the overall coefficient of friction could be improved by such a magnitude.

For a number of uses, the composition is refined to select relatively low molecular weight, i.e., short chain length, telomers and copolymers by the simple expiedient of separating the undissolved solids from a solution of a constituent of the composition, or of the entire composition, prepared without particular concern for chain lengths of the constituents. Clarity of the separated solution has been found to be an excellent indication of the ultimate light transmission of the coating. Separation can be accomplished by decanting, filtering, centrifuging or any of the well-known procedures to accomplish this step in the dissolved constituent.

While any number of solvents are useful provided there is no adverse effect upon the substrate, trichlorotrifluoroethane (Freon TF) is particularly desirable as having suitable organic dissolution powers, high volatility, and little physical or chemical effect on the emulsion. Halogenated aliphatic hydrocarbon solvents having four or fewer carbon atoms are generally preferred. Those skilled in the art will readily recognize specific solvents such as 1, 1, 1-trichloroethane (methyl chloroform), chloroform, tetrachloroethylene, trichloroethylene, methylene chloride, carbon tetrachloride, dichloroethylene and dichloroethane.

The trifluorochloroethylene and vinyl chloride copolymer, in the preferred composition, has a specific gravity of about 1.70 and a relative viscosity in 1 percent cyclohexane of 1.50. A preferred tetrafluoroethylene telomer has a specific gravity of about 2.16 and a melting point of 300° C. Both constituents are readily available from commercial sources under, for example, the trade names FPC 461 and Vydax AR, respectively.

Average molecular weights below about 100,000 for trifluorochloroethylene and vinyl chloride copolymer and below about 3,700 for the tetrafluoroethylene telomer appear to constitute the more desirable ranges for selecting constituents, i.e., those included in the composition before separation.

However, the actual molecular weights are not critical in that the less desirable, high molecular weight fractions are readily removed in the separating step according to a preferred embodiment of the invention.

The relative amounts of trifluorochloroethylene and vinyl chloride copolymers, and tetrafluoroethylene telomers, on a preseparation basis, can be widely varied from 0.5 to 50 parts by weight, and preferably 1.0 parts to 5 parts by weight, of trifluorochloroethylene and vinyl chloride copolymer to each part of tetrafluoroethylene telomer.

The separation step is more efficiently carried out if the trifluorochloroethylene and vinyl chloride copolymer and tetrafluoroethylene are highly diluted, preferably with about 20 parts by weight or more solvent relative to each part by weight of solids. However, any substantial dilution is operable. After separation, the solution can be diluted even further, i.e., several times further dilution will provide good results.

Additives appropriate to any specific end use may be included in the composition. For instance, a conventional antistatic agent can be included in a coating for photographic film to prevent the formation of an electrical charge on the film during use. Any such constituent should, of course, be compatible with the lubricant in terms of solubility, reactivity, etc., but those skilled will have little difficulty in determining workable additives. A conventional amine antistatic agent has been found to function with excellent results on photographic film.

Lubrication of substrates such as photographic film is accomplished by applying the above-described dilute solutions of lubricating compositions to the substrates, evaporating the solvent and, by lightly buffing the surface of the coated film, providing a clear coating. Other substrates can be similarly coated. Magnetic tape of the type utilizing a dispersion of magnetic particles in a binder need not be buffed after coating.

Application of the composition can be accomplished by numerous means. Spraying, dipping, brushing, flowing and doctoring are all workable. For many purposes, dipping is preferred because of the complete and thorough coverage this method affords. Alternatively, either the triflorochloroethylene and vinyl chloride copolymers or tetrafluoroethylene telomer may be applied individually to the substrate and the other constituent subsequently applied with results comparable to those obtained when the constituents are applied in an admixed state.

A more detailed appreciation of the invention will be gained with reference to the following examples.

EXAMPLE I

A lubricating composition according to the instant invention was prepared by adding 0.5 percent by weight of a copolymer of trifluorochloroethylene and vinyl chloride (FPC 461) and 1 percent by weight of a 20 percent suspension of tetrafluoroethylene telomer in Freon TF (Vydax AF) to 98.5 percent by weight of trichlorotrifluoroethane solvent (Freon TF). Then, a small amount (0.7 grams per gallon) of a conventional amine antistatic agent was also included. After allowing the solution to come to equilibrium, the dissolved solids and solvent were decanted from the undissolved portion of the polymeric material. An acetate base color movie film was then machine processed by being dipped into the above-specified solution of lubricating composition with excess solution being removed by a squeegee. The film was then dried and lightly buffed. The resulting lubricated film was then compared with identical acetate-based movie film lubricated commercially utilizing a number of commercially available lubricants. Included among the commercial lubricants was Vydax AR (Lubricant "C").

Two tests were conducted. First, a pin-and-disk test wherein the film was affixed to the surface of a disk rotating at a speed of 30 rpm with a load of 410 grams applied to a stationary one-half inch steel ball slider bearing upon the film was employed. The films were tested to failure as shown by a visible break in the emulsion and/or an increase in friction between the slider and the film.

In a second film-on-film (tape-on-tape with regard to magnetic tape) friction test, a length of the subject film was affixed to the outer cylindrical surface of a disk with a horizontally disposed axis. Another length of film was placed over the first affixed length of film with the emulsion side of the affixed film contacting the back side of the second length. A calibrated weight was secured to one end of the second length of film and a force applied to the other end until movement between the two lengths of film occurred. By conventional calculations, the coefficient of friction between the lengths of film was computed for the various films.

The pin-and-disk laboratory test has shown a significant correlation with wear resistance of film in actual use. The film-on-film friction test has shown a significant correlation to the friction of film in actual use, and particularly to the conditions encountered in a continuous-loop film cartridge. The results are shown below in TABLE I.

TABLE I

Acetate Base Photographic Color Film

| | Pin & Disk Test Average Cycles To Failure | Film-on-Film Test Coefficient of Friction | |
|---|---|---|---|
| | | Test No.1 | Test No.2 |
| Lubricant A | 870 | .15–.17 | .11–.15 |
| Lubricant B | 1130 | .19–.28 | .32–.35 |
| Lubricant C | 1100 | .15–.20 | .17–.20 |
| Lubricant D | 690 | .13–.25 | .24–.28 |
| Lubricant E | 1545 | .15–.17 | .13–.17 |
| Lubricant F | 1270 | .22–.25 | — |
| No Lubricant | 360 | >3.5 | — |
| Lubricant of Example I | 1614 | .11–.15 | .11–.13 |

The results clearly illustrate the superior wear resistance and coefficient of friction of the lubricant prepared according to the instant invention. However, certain other advantages are not apparent from this testing of but two attributes. For instance, Lubricant "E" is, in fact, a supplemental treatment applied to film previously treated with Lubricant "B". Even this two-step approach does not produce results equal to those produced by the simple process and lubricant composition of the instant invention.

EXAMPLE II

The lubricant composition of Example I was applied to a polyester base (Estar) color movie film. A similar length of film was coated with Composition C of Example I, i.e., Vydax AR tetrafluoroethylene telomer. Tests as described in Example I were conducted with the results shown in the following TABLE II.

TABLE II

| | Pin & Disk Test Average Cycles To Failure | Film-on-Film Test Coefficient of Friction | |
|---|---|---|---|
| | | Test No.1 | Test No.2 |
| Lubricant C | 990 | .13–.15 | .14–.16 |
| Lubricant of Example I | 2535 | .08–.11 | .11–.13 |

EXAMPLE III

A length of magnetic tape of the type comprising a dispersion of magnetic oxide particles and a binder upon a polymeric support film produced by a well-known manufacturer of such tapes was obtained and tested for "tape-on-tape" friction as described above. The tape was then cleaned with trichloroethane (Chlorothene NU) and again tested for friction. Thereafter, portions of the clean tapes were treated with a lubricant according to the instant invention prepared as follows: 2 percent by weight of a 20 percent suspension of tetrafluoroethylene telomer in Freon TF (Vydax AR) and 2 percent by weight of a copolymer of trifluorochloroethylene and vinyl chloride (FPC 461) were added to 96 percent by weight of trichlorotrifluoroethane solvent (Freon TF) and a small amount (8 drops/L.) of a conventional amine antistatic agent was added. After the solution came to dissolution equilibrium, the effluent was filtered from the undissolved solids and applied to a portion of the tape cleaned as above described, and allowed to dry. Another portion of the tape was treated with the same lubricant in the above manner except that, after coating, the tape was lightly buffed with two pairs of dry buffers. The results in terms of tape-to-tape friction measured as described in Example I are as follows:

TABLE III

| Treatment | Dry Buffed | Coefficient of Friction |
| --- | --- | --- |
| None (Tape as received) | — | .27–.33 |
| None (Tape cleaned) | — | .28–.29 |
| Lubricant as described | No | .20–.22 |
| Lubricant as described | Yes | .20–.22 |

Though the nature of the lubricant on the commercial film is not known, it can be fairly said that is is representative of lubricants on commercial magnetic tapes. On this basis, the lubricant of the instant invention is clearly superior. Dry buffing after application did not change the improved coefficient of friction.

EXAMPLE IV

A sample of a commercially available magnetic tape of the type described in Example III, but from a different wellknown manufacturer, was obtained and tested for friction as received. After being cleaned in trifluorotrichloroethane (Freon TF), portions of the tape were treated with two lubricants according to the present invention. The first lubricant was prepared by dissolving 4 percent by weight of a 20 percent suspension of tetrafluoroethylene telomer in Freon TF (Vydax AR) and 2 percent by weight of a copolymer of trifluorochloroethylene and vinyl chloride (FPC 461) in 94 percent by weight of trichlorotrifluoroethane (Freon TF), adding a small amount (8 drops/L.) of conventional amine antistatic agent, and then filtering the solution to remove the undissolved polymeric solids. The second composition was prepared as described in Example III. Both lubricated samples were dry buffed after coating. Testing for tape-on-tape friction as described in Example I yielded the following results:

TABLE IV

| Treatment | Coefficient Of Friction |
| --- | --- |
| Tape as received | .64–.87 |
| First Lubricant | .19–.20 |
| Second Lubricant | .20–.22 |

Again, the compositions according to the instant invention show a great improvement over the commercially utilized standard.

EXAMPLE V

Another portion of magnetic tape of the type generally described in Examples III and IV was obtained, cleaned with trichloroethane (Chlorothene NU) and tested for friction. A first lubricant according to the instant invention was prepared by dissolving 1 percent by weight of a 20 percent suspension of tetrafluoroethylene telomer in Freon TF (Vydax AR) and 0.5 percent by weight of a copolymer of trifluorochloroethylene and vinyl chloride (FPC 461) in 98.5 percent by weight of trichloroethane (Chlorothene NU). A smaller amount (8 drops/L.) of antistatic agent was added. A second lubricant according to the instant invention was prepared by dissolving 2 percent by weight of a 20 percent suspension of a telomer of tetrafluoroethylene (Vydax AR) and 1 percent by weight of a copolymer of trifluorochloroethylene and vinyl chloride (FPC 461) in 97 percent by weight of trichlorotrifluoroethane solvent (Freon TF) and separating the undissolved polymeric material from the solution containing the lubricant. The solution was applied by immersing the tape therein and allowing the solvent to evaporate. In certain instances, the dried tape was dry buffed. All portions of the tape were tested for "tape-on-tape" coefficient of friction as described in Example I. The results obtained are shown below in TABLE V.

TABLE V

| Treatment | Dry Buffing | Tape-on-Tape Coefficient Of Friction |
| --- | --- | --- |
| None | No | .25–.26 |
| Lubricant I | No | .15–.17 |
| Lubricant II | Yes | .11–.13 |
| Lubricant II | No | .13–.15 |

Again, the lubricating process according to the instant invention shows substantial improvement over the tape as supplied by the manufacturer. In this instance, some improvement was gained by dry buffing, but the unbuffed sample was markedly superior to the magnetic tape as received.

From the Examples and description, it is believed apparent that the instant invention provides an unusual and particularly advantageous lubricating composition resulting from the use of two dissimilar materials. The combination of a lubricant and nonlubricant provide a coefficient of friction below that of the lubricant per se. Further, the method of lubricating such substrates as photographic film and magnetic tapes has been demonstrated to yield superior results. Thus, substrates so lubricated are superior to similar substrates lubricated with conventional compositions.

Although the several specific embodiments of the present invention have been illustrated with particularly demanding substrates, it is apparent that those skilled in the art will recognize numerous changes and modifications within the scope of the invention including application of the invention to other substrates, and that such changes may be made without departing from the scope of the invention, as defined by the following claims.

What is claimed is:

1. A method of lubricating substrates, comprising: admixing a copolymer of trifluorochloroethylene and vinyl chloride, a tetrafluoroethylene telomer and a solvent, applying the admixture to a substrate, and removing the solvent from the admixture, whereby a lubricous coating is deposited upon the substrate.

2. A method as set forth in claim 1, wherein the substrate is a magnetic tape.

3. A method as set forth in claim 1, wherein the coating is buffed after the solvent is removed.

4. A method as set forth in claim 1, wherein after admixing the copolymer and telomer in the solvent, any undissolved portions are separated therefrom.

5. A method as set forth in claim 4, wherein the separation is accomplished by filtering the admixture.

6. A method as set forth in claim 4, wherein the separation is accomplished by decanting effluent of the admixture.

7. A method as set forth in claim 4, wherein the substrate to which the separated solution is applied is a photographic film.

8. A method as set forth in claim 7, wherein the separation is accomplished by filtering.

9. A method as set forth in claim 1, wherein the copolymer and telomer are admixed in a ratio of between 0.5 parts by weight and 50 parts by weight of copolymer to each part of telomer.

10. A method as set forth in claim 1, wherein the copolymer and telomer are admixed in a ratio of between 1.0 parts by weight and 5 parts by weight of copolymer for each part of telomer.

11. A method as set forth in claim 1, wherein the solvent is a halogenated aliphatic hydrocarbon solvent having four or fewer carbon atoms.

12. A method as set forth in claim 11, wherein the solvent is selected from the group consisting of trichlorotrifluoroethane, 1,1,1-trichloroethane (methyl chloroform), chloroform, tetrachloroethylene, trichloroethylene, methylene chloride, carbon tetrachloride, dichloroethylene and dichloroethane.

13. A method of lubricating magnetic substrates, comprising: combining a copolymer of trifluorochloroethylene and vinyl chloride, a tetrafluoroethylene telomer and a solvent for the polymeric constituents, applying the combined ingredients to the magnetic substrate, and removing the solvent therefrom, whereby the polymeric materials are deposited upon the surface of the magnetic substrate to provide a thin, lubricous coating thereon.

14. A method as set forth in claim 13, wherein the lubricated surface of the magnetic substrate is buffed after the solvent is removed.

15. A method as set forth in claim 13, wherein the undissolved copolymer and undissolved telomer are separated from the dissolved copolymer and dissolved telomer before application of the dissolved ingredients to the magnetic substrate.

16. A method of lubricating the surface of photographic film, comprising: combining a copolymer of trifluorochloroethylene and vinyl chloride, a tetrafluoroethylene telomer and a solvent for the copolymer and telomer materials, separating the undissolved portions of the copolymer and telomer from the solution, applying the solution to the film surface, removing the solvent from the film surface, and lightly buffing the deposited copolymer and telomer on the film surface, whereby a thin, transparent, protective and low friction coating is formed on the surface of the photographic film.

17. A method of lubricating substrates, comprising: applying a copolymer of trifluorochloroethylene and vinyl chloride in a solvent to the surface of the substrate, applying a tetrafluoroethylene telomer in a solvent to the surface, and removing the solvent from the surface.

* * * * *